July 14, 1953   E. LANGEN   2,645,589
METHOD AND APPARATUS FOR THE CONTINUOUS
EXTRACTION OF SUGAR FROM SUGAR BEETS
Filed July 11, 1950   3 Sheets-Sheet 2
Fig. 2.
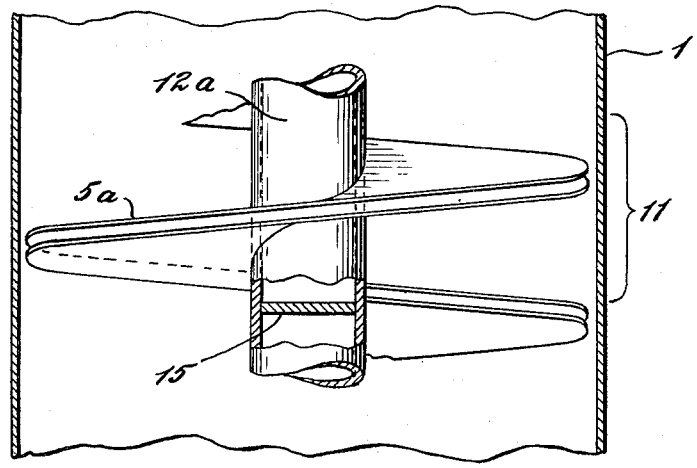
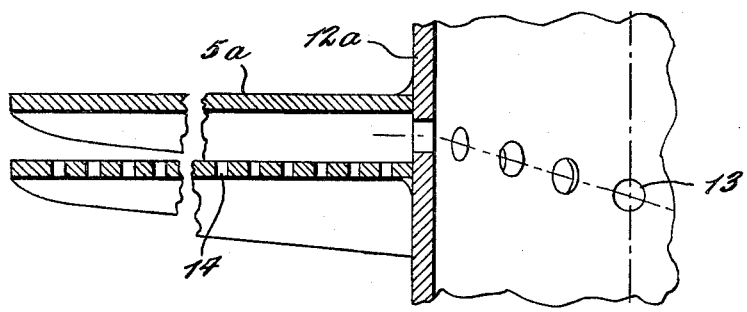
Fig. 3.
INVENTOR.
Eugen Langen
BY
ATTORNEYS July 14, 1953
E. LANGEN
2,645,589
METHOD AND APPARATUS FOR THE CONTINUOUS
EXTRACTION OF SUGAR FROM SUGAR BEETS
Filed July 11, 1950
3 Sheets-Sheet 3
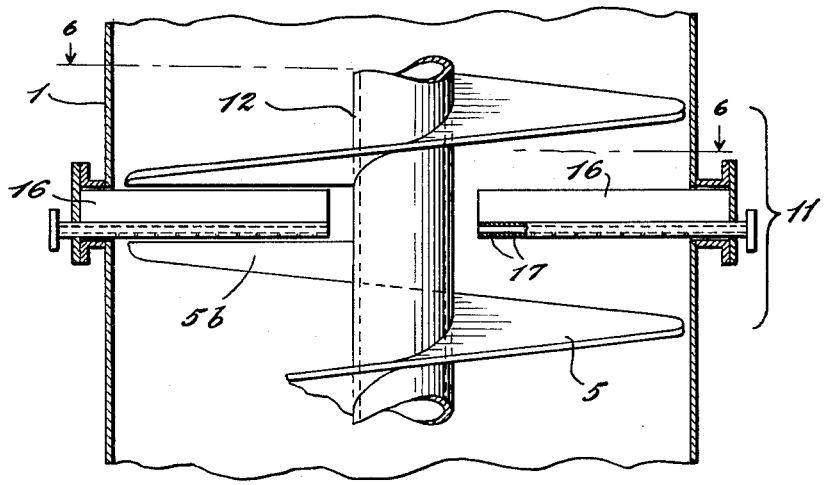
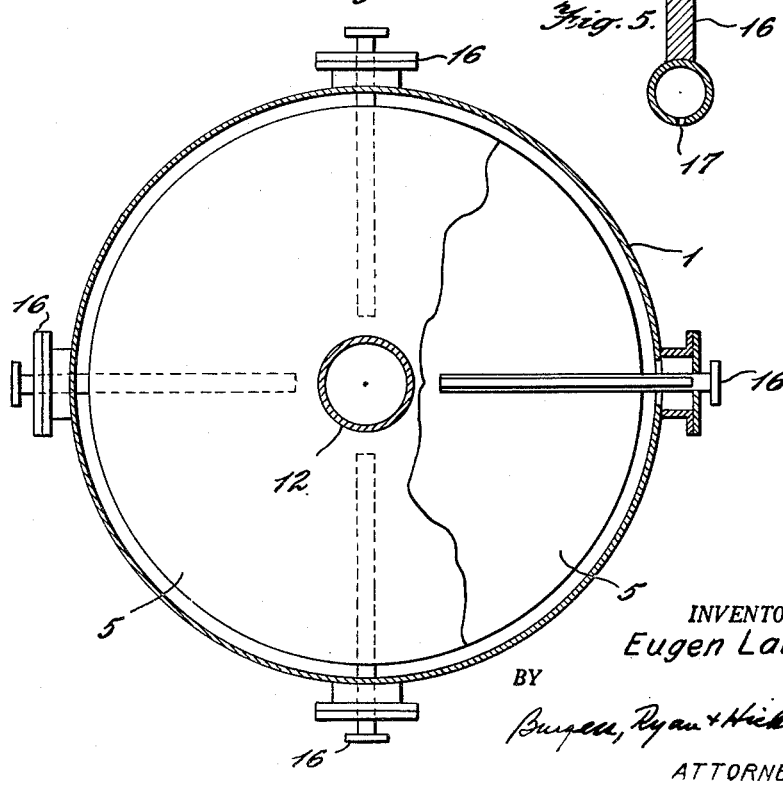
INVENTOR.
Eugen Langen
BY
Burgess, Ryan & Hicks
ATTORNEYS Patented July 14, 1953

2,645,589

UNITED STATES PATENT OFFICE 2,645,589

METHOD AND APPARATUS FOR THE CONTINUOUS EXTRACTION OF SUGAR FROM SUGAR BEETS

Eugen Langen, Haus Etzweiler, Elsdorf, Germany, assignor, by mesne assignments, to Superior Sugar Extraction, Inc., New York, N. Y., a corporation of New York Application July 11, 1950, Serial No. 173,156
In Germany October 31, 1949

7 Claims. (Cl. 127—7)

The present invention relates to improvements in method and apparatus for the continuous extraction of sugar from sugar beet slices.

An object of the invention is to provide a method and an apparatus in which the usual pre-scalding of the beet slices prior to their entering an extraction apparatus is rendered unnecessary. Another object of the present invention is to conserve heat in the processing of the sliced beets and thus, make the extraction process more economical. When slices of beets that have been pre-scalded in the usual manner are introduced into an extraction device of the continuous type countercurrent to the flow of an extraction fluid, the temperature of the fluid is in the neighborhood of from 158° to 176° F. (70° to 80° C.) and the temperature of the pre-scalded slices should be about 165° F. (74° C.) for proper diffusion. Ordinarily, the raw juices coming from the extraction apparatus are utilized for the pre-scalding of the slices after they have been adequately heated. However, this arrangement has certain inherent disadvantages in that it involves the expense of heating the raw juices to a temperature that will heat the slices of beets to their required temperature and a large part of this heat is wasted since the temperature at which the raw juices leave the pre-scalding operation will be comparatively high (about 165° F. or 74° C.). In addition, this temperature for the raw juices will hinder the use of so-called preseparation processes to which the raw juices are subjected thereafter.

Various other objects and advantages of the invention will be apparent and best understood from the following description and the accompanying drawings in which:

Fig. 2 is a vertical section of a portion of one of the towers illustrated in Fig. 1 on an enlarged scale;

Fig. 3 is a vertical section illustrating certain details of the arrangement shown in Fig. 2 on an enlarged scale;

Fig. 4 is a vertical section of a portion of one of the towers illustrating a modified form of the apparatus shown in Figs. 1 and 2;

Fig. 5 is an end view in section of one of the heating devices shown in Fig. 4; and Fig. 6 is a section taken along the line 6—6 of Fig. 4.

Figure 1:
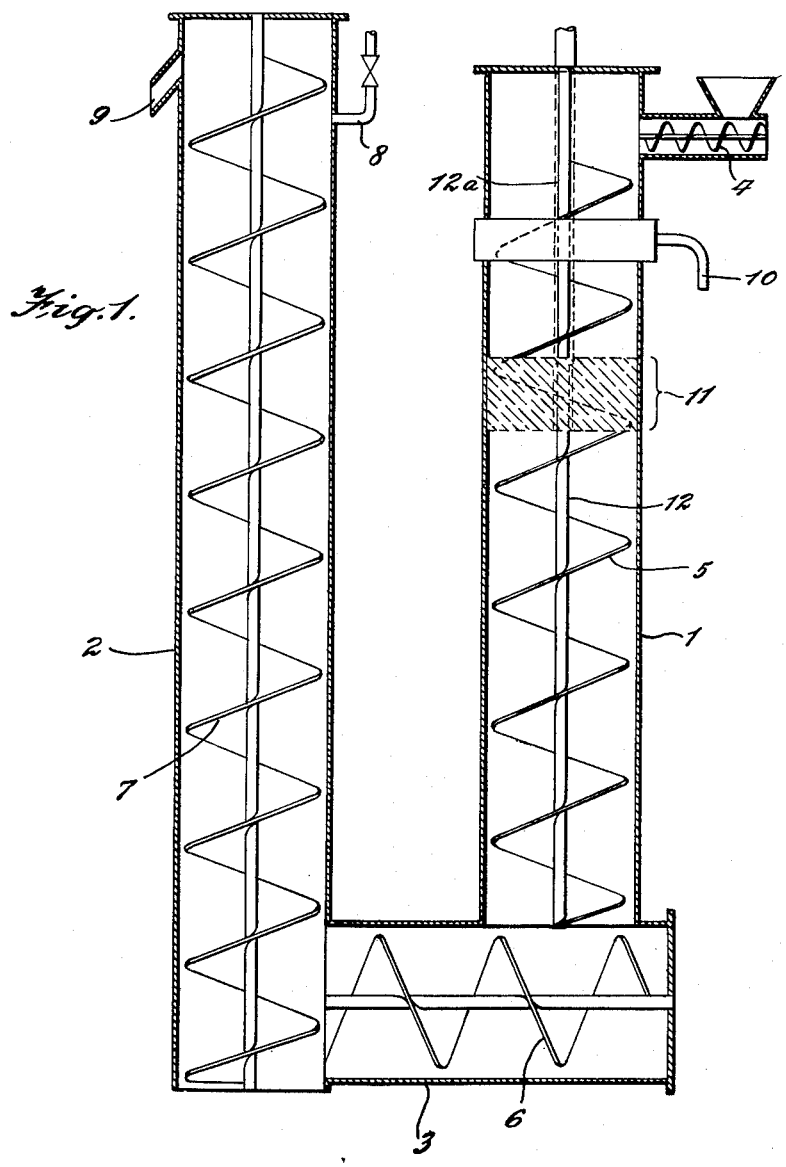
Fig. 1 is a schematic illustration in vertical section of a double-tower type of extraction device embodying the present invention.

The extraction apparatus illustrated in Fig. 1 is of the type wherein a vertical pre-extractor tower 1 and an after-extractor tower 2 connected with each other through a ground pipe 3 are employed in carrying out the extraction process. The beet slices which are to be extracted are introduced into the pre-extractor tower 1 through a hopper and a worm or volute 4. Worms or volutes 5, 6 and 7 rotating within the towers 1 and 2 and the ground pipe 3 move the slices through the extraction apparatus in counterflow to an extraction fluid that is introduced at the top of the second tower 2 through a pipe 8. The exhausted slices leave the upper end of the second extraction tower 2 via an outlet 9 located at the upper end thereof and the raw juices are discharged from the upper end of the pre-extractor tower 1 through the pipe 10.

In practicing the present invention, the slices of beets are heated in a heating zone 11 of the pre-extractor tower 1 by heating the beets and the liquid surrounding them in the tower. The slices of beets may be heated by introducing steam into the slices in the heating zone in an amount and at a temperature that is sufficient to heat the slices to a temperature of about 165° F. (74° C.) as they leave the heating zone.

The steam may be introduced into the slices in the heating zone in different ways. For instance, as shown in Fig. 2, the shaft 12 supporting the volute 5 in the first tower may be provided with a hollow portion, as indicated at 12a, that extends to the spiral 5a of the volute 5 located at the heating zone. The spiral 5a in the heating zone is double walled with openings 13 in the hollow shaft 12 communicating with the space between the walls of the spiral. The steam that is introduced into the slices is lead through the hollow portion of the shaft 12 through suitable openings 13 to the space between the walls of the double-walled portion of the spiral 5a and then through suitable openings 14 in the lower wall of the spiral 5a. A cutting-off bottom 15 is provided in the shaft 12 to prevent the steam from flowing further through the shaft and heating the slices elsewhere in the apparatus.

The steam may also be introduced through so-called arrestors 16 which are placed at intervals around the circumference of the first tower 1 at the heating zone and extend into the interior of the tower, as shown in Figs. 4 and 6. The arrestors 16 are hollow and may have nozzles at their ends and/or holes 17 drilled along their bottom edges. The area for the emerging steam may be kept sufficiently large so that the entering of the steam is practically noiseless.

The heating zone 11 is positioned so that it performs two functions. First, it balances by diffusion the dilution which was brought about by condensation of the steam as the unheated slices and the extraction liquid are being heated in the heating zone. Secondly, it is positioned so that the temperature of the extraction liquid (the raw juices) which was raised to about 165° F. (74° C.) in the heating zone so as to raise the incoming raw slices to the proper temperature (165° F.) is permitted to lower or cool to about 104° F. (40° C.) before the juices are discharged from the extraction apparatus. Thus, it is of essential importance in heating that the steam be introduced at such a distance from the juice outlet 10 that the interval between the juice outlet and the heating zone 11 is sufficient to permit the hot juices to cool as they move through the slices above the heating zone at least down to 104° F. (40° C.) and further to balance through exhaustion the juice dilution brought about by condensation of the steam being introduced.

The system of this invention is not limited to the above-mentioned double tower but can be applied to all other kinds of diffusion apparatus in the same way, for instance, it may be used in the so-called Rapid machine or the so-called Berge drum.

I claim:

1. In an apparatus for extracting sugar from sugar beets wherein slices of unheated beets are introduced into the apparatus and are moved through the apparatus countercurrent to the flow of an extraction liquid in which said slices are immersed, said liquid containing extracted substances being discharged from the apparatus at a point adjacent an inlet for introducing the unheated slices, the combination of a rotatable shaft supporting a conveyor screw for moving the slices of beets through the apparatus, a double-walled spiral on said conveyor screw having openings in the lower wall thereof, a portion of said shaft being hollow and communicating with the space between the double-walled spiral of the conveyor screw for the introduction of steam into the extraction liquid and the slices of beets contained therein at a heating zone, said heating zone being located at a distance from the discharge point of the extraction liquid permitting the liquid to cool from a temperature of 160° to 170° F. to a temperature of at least 104° F. and to balance by diffusion dilution resulting from condensation of the steam introduced in said heating zone.

2. In an apparatus for extracting sugar from sugar beets wherein slices of unheated beets are introduced into the apparatus and are moved through the apparatus countercurrent to the flow of an extraction liquid in which said slices are immersed, said liquid containing extracted substances being discharged from the apparatus at a point adjacent an inlet for introducing the unheated slices, the combination of a rotatable shaft supporting a conveyor screw for moving the slices of beets through the apparatus, a series of arrestors extending into the extracting liquid with slices of beets contained therein for introducing steam into said liquid and said slices at a heating zone, said heating zone being located at a distance from the discharge point of the extraction liquid permitting the liquid to cool from a temperature of 160° to 170° F. to a temperature of at least 104° F. and to balance by diffusion dilution resulting from condensation of the steam introduced in said heating zone.

3. In a method of extracting sugar from slices of sugar beets wherein slices of beets are continuously introduced into an extraction apparatus and an extraction liquid containing extracted sugar is continuously being discharged therefrom, the steps of moving slices of beets countercurrent to the flow of an extraction liquid through a heating zone in the apparatus, heating the slices of beets and the surrounding extraction liquid in the heating zone by introducing steam into said zone in an amount sufficient to raise the temperature of the slices of beets leaving said heating zone to the neighborhood of 165° F., permitting the extraction liquid to cool to a temperature of at least 104° F. prior to discharging said liquid from the apparatus and balancing the dilution of the extraction liquid resulting from condensation of the steam in the heating zone by diffusion of slices of beets entering said liquid.

4. In a method of extracting sugar from slices of sugar beets wherein slices of beets are continuously introduced into an extraction apparatus and an extraction liquid containing extracted sugar is continuously being discharged therefrom, the steps of moving slices of beets countercurrent to the flow of an extraction liquid through a heating zone in the apparatus, heating the slices of beets and the extracting liquid surrounding said slices by introducing steam into said heating zone so that the temperature of the slices leaving said heating zone is 165° F. and then cooling the extraction liquid to at least 104° F. prior to discharging said liquid from the apparatus by introducing unheated slices of beets into the liquid and balancing the dilution of the extraction liquid resulting from condensation of steam in the heating zone by the diffusion of the slices introduced into said liquid.

5. An apparatus for extracting sugar from a sugar bearing material of the type wherein the sugar bearing material is moved continuously through the apparatus countercurrent to the flow of an extraction liquid and the extraction liquid containing extracted sugar is continuously being discharged from the apparatus, which includes means for introducing steam into an extraction liquid containing sugar bearing material and heating said liquid and the material contained therein, said heating means being located at a point remote from an outlet for the liquid containing extracted sugar, the distance from said point to said outlet being sufficient for the extraction liquid to cool from a temperature of from 160° to 170° F. to a temperature of at least 104° F. and for dilution of the extraction liquid due to condensation of the steam to be balanced by diffusion of sugar bearing material in the liquid prior to discharge of the liquid from the apparatus.

6. An apparatus for extracting sugar from sugar beets of the type wherein a vertical tower contains a conveyor for continuously moving slices of beets through the tower countercurrent to the flow of an extraction liquid and the extracting liquid containing extracted sugar is continuously discharged from the tower that is characterized by means for introducing steam into the extraction liquid and heating the slices of beets contained therein, said heating means being located at a point remote from an outlet for the extraction liquid, the distance of said point from said outlet being sufficient for the extraction liquid and the slices of beets contained therein to cool from a temperature of about 165° F. to a temperature of about 104° F. and for dilution of the liquid due to condensation from the steam introduced into the liquid to be balanced by diffiusion prior to said liquid being discharged from the tower.

7. An apparatus for extracting sugar from sugar beets of the type wherein a vertical tower contains a conveyor for continuously moving slices of beets through the tower countercurrent to the flow of an extraction liquid and the extraction liquid containing extracted sugar is continuously discharged from the tower that is characterized by means for heating slices of beets and the extraction liquid by introducing steam into the tower at a point spaced from an outlet for the extraction liquid, the distance that said means is spaced from the outlet for the extraction liquid being such that when the slices of beets are heated to a temperature of 165° F., the extraction liquid will cool to a temperature of 104° F. and dilution of the liquid due to condensation from the heating of the slices will be balanced by diffusion prior to said liquid being discharged from the tower.

EUGEN LANGEN.

References Cited in the file of this patent

UNITED STATES PATENTS

| Number | Name | Date |
|---|---|---|
| 746,734 | Naudet | Dec. 15, 1903 |
| 2,496,523 | Dubourg | Feb. 7, 1950 |

FOREIGN PATENTS

| Number | Country | Date |
|---|---|---|
| 29,961 | France | Sept. 8, 1925 |
| | (Add'n to No. 539,104) | |
| 117,554 | France | Mar. 23, 1877 |